United States Patent
Geiger et al.

(10) Patent No.: US 8,463,011 B2
(45) Date of Patent: Jun. 11, 2013

(54) TOOLS FOR AUTOMATIC COLONIC CENTERLINE EXTRACTION

(75) Inventors: Bernhard Geiger, Cranbury, NJ (US); Sandra Sudarsky, Bedminster, NJ (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/245,018

(22) Filed: Sep. 26, 2011

(65) Prior Publication Data

US 2012/0140997 A1 Jun. 7, 2012

Related U.S. Application Data

(60) Provisional application No. 61/388,048, filed on Sep. 30, 2010.

(51) Int. Cl.
*G06K 9/00* (2006.01)
(52) U.S. Cl.
USPC .......................................... 382/128; 382/258
(58) Field of Classification Search
USPC ....................................................... 382/128
See application file for complete search history.

(56) References Cited

U.S. PATENT DOCUMENTS

| | | | | |
|---|---|---|---|---|
| 6,343,936 | B1 * | 2/2002 | Kaufman et al. | 434/262 |
| 7,574,024 | B2 * | 8/2009 | Bitter et al. | 382/128 |
| 7,711,163 | B2 * | 5/2010 | Geiger et al. | 382/128 |

* cited by examiner

*Primary Examiner* — Tom Y Lu
(74) *Attorney, Agent, or Firm* — Donald B. Paschburg; F. Chau & Associates, LLC

(57) ABSTRACT

A method for extracting a colonic centerline includes segmenting a colon from a digital image of a patient's abdomen, selecting one extreme point of the colon as a source point, calculating a first distance transform of every point in the colon that is a distance of a point to the source point, and calculating a second distance transform of every point in the colon, that is a shortest distance of a point to a wall point of the colon. A centerline path is generated through the colon using the first and second distance transforms, starting from a point with a greatest distance to the source point as determined by the first distance transform, and adding points to the centerline path by selecting points with a greatest distance to the source point that are farthest from the wall of the colon using the second distance transform.

15 Claims, 7 Drawing Sheets

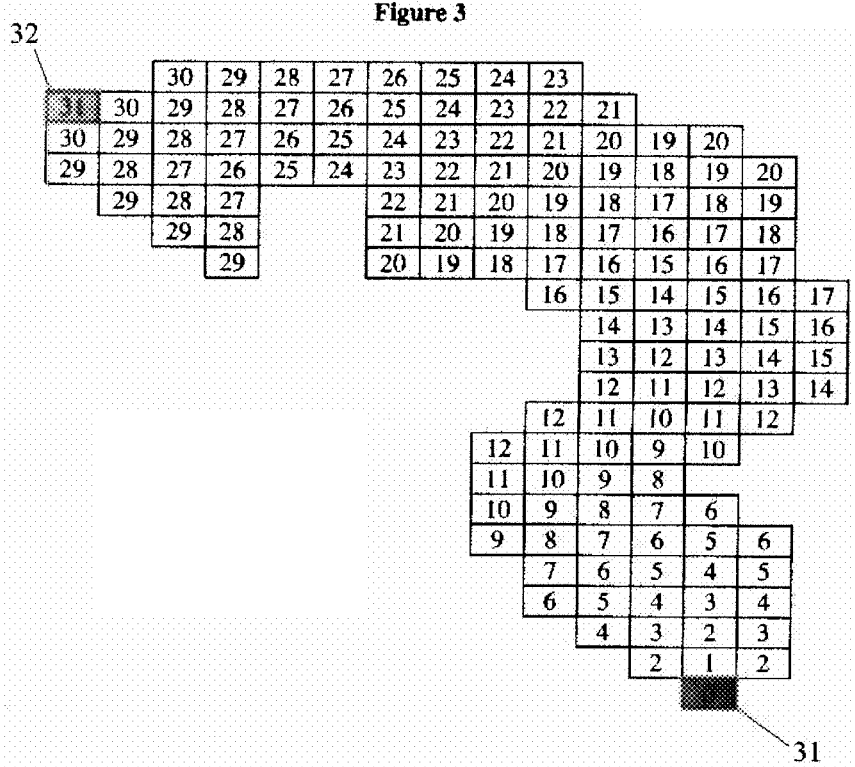
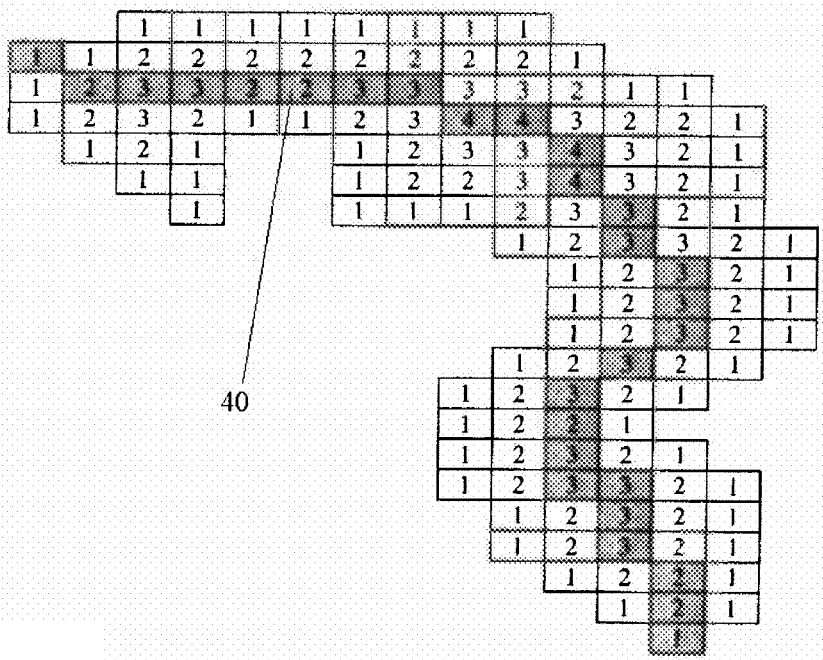

60

70

TOOLS FOR AUTOMATIC COLONIC CENTERLINE EXTRACTION

CROSS REFERENCE TO RELATED UNITED STATES APPLICATIONS

This application claims priority from "Tools for Automatic Colonic Centerline Extraction", U.S. Provisional Application No. 61/388,048 of Geiger, et al., filed Sep. 30, 2010, the contents of which are herein incorporated by reference in their entirety.

TECHNICAL FIELD

This disclosure is directed to methods for automatically extracting a colon centerline in digital medical images, such as computer tomography (CT) or magnetic resonance (MR) images.

DISCUSSION OF THE RELATED ART

Virtual Colonoscopy is a non-invasive diagnostic procedure aimed at exploring the inner colonic surface in search for lesions. Using advanced image-processing techniques, 3-dimensional (3D) models are reconstructed from a series of high resolution 2-dimensional (2D) images. A physician can then automatically or interactively navigate through the 3D virtual model to perform a diagnosis.

The calculation of the colonic centerline is a fundamental part of any virtual colonoscopy framework. Centerlines are often used to automate the interluminal navigation, to estimate distance measurements, and to facilitate the registration between supine and prone CT scans.

Early techniques for centerline extraction required significant user interaction. In recent years, several automatic techniques have been presented in the literature. Most of them are based on a topological thinning technique or a distance mapping transform.

Topological thinning techniques peel off voxels a layer at time until only one single skeleton remains. Certain constraints must be maintained to ensure that the topology of the object is preserved. Once the skeleton is found, undesirable branches must be removed to isolate the central path. This technique generates accurate approximations but the iterative nature makes the algorithms computationally intensive. New algorithms have been proposed to accelerate the computation.

Distance mapping techniques include two steps. First, a distance transform from a source point of the colon to each voxel inside the 3D object is calculated. Second, the centerline is computed using Dijkstra's shortest path algorithm. Distance mapping techniques are computationally efficient. However, the shortest path tends to hug corners at regions of high curvature. Recent algorithms have been proposed to push the shortest path toward the object center.

SUMMARY OF THE INVENTION

Exemplary embodiments of the invention as described herein generally include methods and systems for colon centerline extraction based on two distance transforms. One describes the distance from every voxel to a source while the second encapsulates the distance of every voxel to the colonic wall. By using some heuristics based on these transforms, a path may be computed that provides an accurate approximation to the centerline. This centerline can be used to automate the interluminal navigation, to estimate distance measurements, and to facilitate the registration between supine and prone CT scans. Compared to previous distance mapping techniques, the centricity of the path is improved by using an additional distance transform.

According to an aspect of the invention, there is provided a method for extracting a colonic centerline from a digital image, including segmenting a colon from a digital image of a patient's abdomen, and selecting one extreme point of the colon in the segmented image as a source point, calculating a first distance transform of every point in the colon, where the first distance transform of a point is a distance of that point to the source point of the colon, calculating a second distance transform of every point in the colon, where the second distance transform of a point is a shortest distance of that point to a wall point of the colon, and generating an initial centerline path through the colon using the first distance transform and the second distance transform, starting from a point with a greatest distance to the source point as determined by the first distance transform, and adding points to the centerline path by selecting points with a greatest distance to the source point but less than the distance of the starting point as determined by the first distance transform that are farthest from the wall of the colon using the second distance transform.

According to a further aspect of the invention, the method includes smoothing the initial colonic centerline path, and, if the smoothing moves colonic centerline path points closer to the colonic wall, re-centering the colonic centerline path.

According to a further aspect of the invention, the first distance transform is calculated using a region growing algorithm that starts with the source point, assigns an initial distance of 0 to the source point, and at each iteration assigns a distance to neighbors of a previously visited point that is an increment of the distance of the previously visited point.

According to a further aspect of the invention, the second distance transform is calculated using a region growing algorithm that starts from surface points by the colonic wall, assigns an initial distance of 1 to each surface point, and at each iteration assigns a distance to neighbors of a previously visited point that is an increment of the distance of the previously visited point.

According to a further aspect of the invention, generating an initial centerline path through the colon using the first distance transform and the second distance transform further comprises repeating, for each current path point, until the source point is reached, visiting all k connected neighbors of the current path point, where if the first distance transform of a currently visited neighbor is less than the first distance transform of the current path point and the second distance transform of the currently visited neighbor is greater than the second distance transform of the current path point, the currently visited neighbor is added to the path and is assigned as the current path point.

According to a further aspect of the invention, if the first distance transform of a currently visited neighbor is less than the first distance transform of the current path point and the second distance transform of the currently visited neighbor is equal to the second distance transform of the current path point, the currently visited neighbor is assigned as a first priority backup point, if the first distance transform of a currently visited neighbor is equal to the first distance transform of the current path point and the second distance transform of the currently visited neighbor is greater than the second distance transform of the current path point, the currently visited neighbor is assigned as a second priority backup point, and if the first distance transform of a currently visited neighbor is less than the first distance transform of the current path point and the second distance transform of the currently visited neighbor is less than the second distance transform of the current path point, the currently visited neighbor is assigned as a third priority backup point.

According to a further aspect of the invention, the method includes, after all k connected neighbors of the current path point have been visited, selecting a highest priority backup point to be added to the path, and assigning the highest priority backup point as the current path point.

According to a further aspect of the invention, if the first distance transform of a currently visited neighbor is less than the first distance transform of the current path point and the second distance transform of the currently visited neighbor is equal to the second distance transform of the current path point, the currently visited neighbor is assigned as a first priority backup point, if the first distance transform of a currently visited neighbor is equal to the first distance transform of the current path point and the second distance transform of the currently visited neighbor is greater than the second distance transform of the current path point, the currently visited neighbor is assigned as a second priority backup point, if the first distance transform of a currently visited neighbor is greater than the first distance transform of the current path point and the second distance transform of the currently visited neighbor is greater than the second distance transform of the current path point, the currently visited neighbor is assigned as a third priority backup point, if the first distance transform of a currently visited neighbor is less than the first distance transform of the current path point and the second distance transform of the currently visited neighbor is less than the second distance transform of the current path point, the currently visited neighbor is assigned as a fourth priority backup point.

According to a further aspect of the invention, the method includes, after all k connected neighbors of the current path point have been visited, selecting a highest priority backup point to be added to the path, and assigning the highest priority backup point as the current path point.

According to another aspect of the invention, there is provided a method for extracting a colonic centerline from a digital image, including segmenting a colon from a digital image of a patient's abdomen, and selecting one extreme point of the colon in the segmented image as a source point, and generating an initial centerline path through the colon using a first distance transform and a second distance transform, starting from a point with a greatest distance to the source point as determined by the first distance transform, and adding points to the centerline path by selecting points with a greatest distance to the source point but less than the distance of the starting point as determined by the first distance transform that are farthest from the wall of the colon using a second distance transform, where generating an initial centerline path through the colon using the first distance transform and the second distance transform further comprises repeating, for each current path point, until the source point is reached, visiting all k connected neighbors of the current path point, where if the first distance transform of a currently visited neighbor is less than the first distance transform of the current path point and the second distance transform of the currently visited neighbor is greater than the second distance transform of the current path point, the currently visited neighbor is added to the path and is assigned as the current path point.

According to a further aspect of the invention, the method includes calculating a first distance transform of every point in the colon, where the first distance transform of a point is a distance of that point to the source point of the colon, by using a region growing algorithm that starts with the source point, assigns an initial distance of 0 to the source point, and at each iteration assigns a distance to neighbors of a previously visited point that is an increment of the distance of the previously visited point.

According to a further aspect of the invention, the method includes calculating a second distance transform of every point in the colon, where the second distance transform of a point is a shortest distance of that point to a wall point of the colon, by using a region growing algorithm that starts from surface points by the colonic wall, assigns an initial distance of 1 to each surface point, and at each iteration assigns a distance to neighbors of a previously visited point that is an increment of the distance of the previously visited point.

According to a further aspect of the invention, if the first distance transform of a currently visited neighbor is less than the first distance transform of the current path point and the second distance transform of the currently visited neighbor is equal to the second distance transform of the current path point, the currently visited neighbor is assigned as a first priority backup point, if the first distance transform of a currently visited neighbor is equal to the first distance transform of the current path point and the second distance transform of the currently visited neighbor is greater than the second distance transform of the current path point, the currently visited neighbor is assigned as a second priority backup point, and if the first distance transform of a currently visited neighbor is less than the first distance transform of the current path point and the second distance transform of the currently visited neighbor is less than the second distance transform of the current path point, the currently visited neighbor is assigned as a third priority backup point, and further comprising, after all k connected neighbors of the current path point have been visited, selecting a highest priority backup point to be added to the path, and assigning the highest priority backup point as the current path point.

According to a further aspect of the invention, if the first distance transform of a currently visited neighbor is less than the first distance transform of the current path point and the second distance transform of the currently visited neighbor is equal to the second distance transform of the current path point, the currently visited neighbor is assigned as a first priority backup point, if the first distance transform of a currently visited neighbor is equal to the first distance transform of the current path point and the second distance transform of the currently visited neighbor is greater than the second distance transform of the current path point, the currently visited neighbor is assigned as a second priority backup point, if the first distance transform of a currently visited neighbor is greater than the first distance transform of the current path point and the second distance transform of the currently visited neighbor is greater than the second distance transform of the current path point, the currently visited neighbor is assigned as a third priority backup point, if the first distance transform of a currently visited neighbor is less than the first distance transform of the current path point and the second distance transform of the currently visited neighbor is less than the second distance transform of the current path point, the currently visited neighbor is assigned as a fourth priority backup point, and further comprising, after all k connected neighbors of the current path point have been visited, selecting a highest priority backup point to be added to the path, and assigning the highest priority backup point as the current path point.

According to a another aspect of the invention, there is provided a non-transitory program storage device readable by a computer, tangibly embodying a program of instructions executed by the computer to perform the method steps for extracting a colonic centerline from a digital image.

BRIEF DESCRIPTION OF THE DRAWINGS

FIG. 3 shows an example of the distance to source transform for a 2D object according to an embodiment of the invention.

FIG. 4 shows the corresponding distance to wall transform based on the city-block metric, according to an embodiment of the invention.

DETAILED DESCRIPTION OF EXEMPLARY EMBODIMENTS

Figure 1:
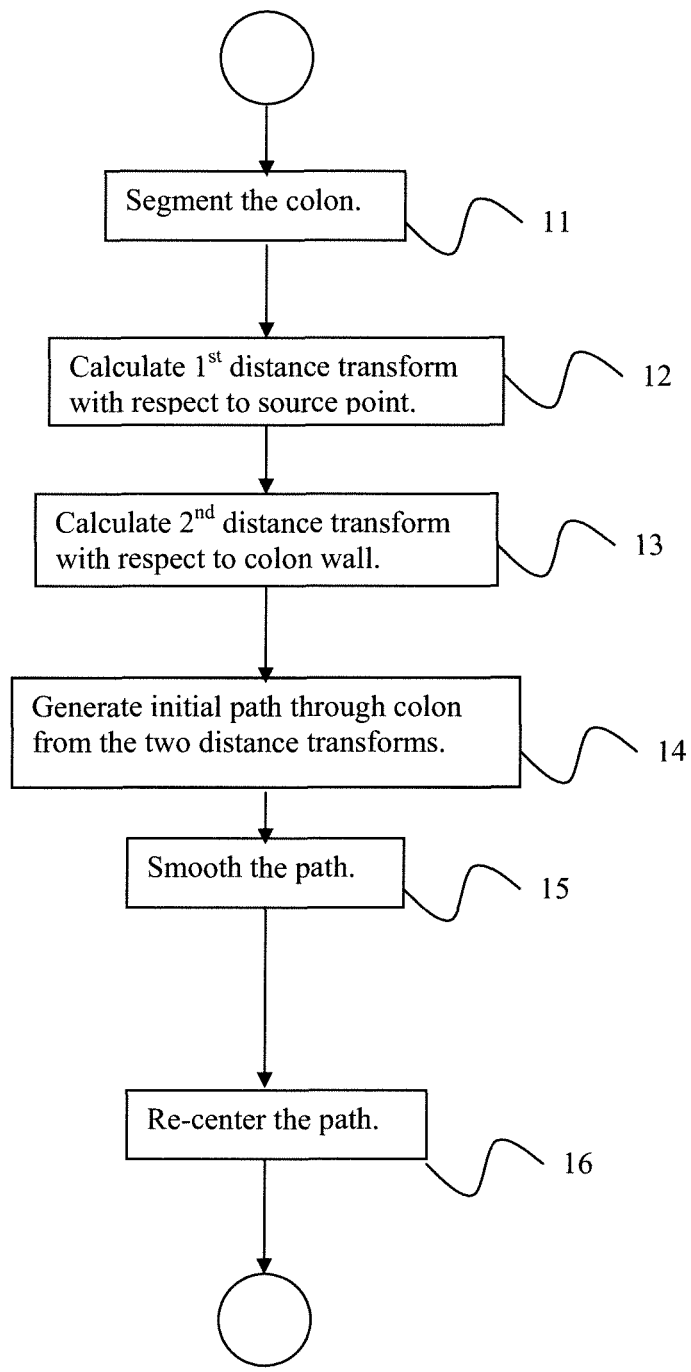
FIG. 1 is a flowchart of an algorithm to automatically extract a colon centerline from a digital medical image, according to an embodiment of the invention.

Exemplary embodiments of the invention as described herein generally include systems and methods for automatically extracting colon centerlines from digital medical images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-dimensional images and voxels for 3-dimensional images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

FIG. 1 is a flowchart of a centerline extraction algorithm according to an embodiment of the invention. Given a 3D image of the colon, an algorithm according to an embodiment of the invention begins at step 11 by segmenting the colon. An exemplary, non-limiting method of segmenting the colon uses a thresholding region-growing scheme. During this process, one of the extreme points of the colon is identified as the source point s. An extreme point of the colon may be identified applying a distance growing algorithm to an arbitrary seed point inside the colon. A distance growing algorithm is a region growing algorithm that keeps track of the number of iterations required to reach the seed point. The point with largest "distance" is one of the extreme points of the colon. Another distance growing algorithm may be started from this extreme point to find the other extreme point. Next, at step 12, a first distance transform d[x], which is a measure of the distance of every voxel x to s, and at step 13, a second distance transform w[x], which is a measure of the closest distance of every voxel x to the colon wall, are calculated.

The first distance transform, represented by d[x], is computed based on a region growing algorithm by assigning a value 0 to the source point s, i.e. d[s]=0, and by placing s into a queue. During each iteration, the first element i is removed from the queue and each non-marked k-connected neighbors $n_i$ of i inside the colon is assigned the value of $d[n_i]=d[i]+1$. These elements are now marked and placed in the queue.

The second distance transform, w[x], is generated in a similar fashion. Initially, all of the surface voxels are assigned the value 1 and pushed into the queue. As each voxel i is retrieved from the queue, the distance of its non-marked k-neighbors is updated. Different metrics can be used to define this transform, including "city-block", Chamfer distance transforms, or vector methods such as the 4-point sequential Euclidean Distance (4SED) or the 8-point sequential Euclidean Distance (8SED) mapping algorithms.

Based on these two transforms, an initial centerline path can be generated at step 14 that starts from the voxel c with the largest distance to the source point s, according to the first distance transform d. A flowchart of an algorithm according to an embodiment of the invention for generating this path is presented in FIG. 2A. A path generation algorithm according to an embodiment of the invention begins at step 200a selecting the voxel c with the largest first distance transform and using it as the current point to initialize the path. An iteration counter i and a buffer A for saving candidates for the next center point are initialized at step 202a. An algorithm according to an embodiment of the invention loops over all of c's 26 neighbors $n_i$ from step 203a, and during each iteration, one of c's 26-neighbors $n_i$ is selected as a candidate point to be added to the centerline.

A candidate voxel with a smallest distance from the source point, determined using the first distance transform at step 204a, and a largest distance from the colon surface, determined using the second distance transform at step 205a, is selected at step 206a from the 26-connected neighboring voxels to be added to the path. This selection enforces the criterion that d[c']<=d[c] where c' is the newly selected point and is as far away from the colon surface as possible. The newly selected point is added to the path at step 216a, and its first distance transform value is checked at step 217a. The path construction terminates when first distance transform value, d[c]=0, which occurs when c=s, i.e., when the candidate point is the source point. Note that each voxel in the volume, except for s, has at least one connected neighbor whose distance to s is less than that of this voxel.

If the candidate point $n_i$ fails the first distance transform comparison at step 204a, it is determined whether the first distance transform for the candidate point $n_i$ is equal to that of c and whether the second distance transform value for the candidate point $n_i$ is greater than that for c at step 207a. If the candidate point $n_i$ satisfies the comparison at step 207a, the candidate point is saved in the buffer A at step 208a, the iteration counter is incremented at step 214a, and compared with 26 at step 203a. If the candidate point $n_i$ fails the comparison at step 207*a*, the next candidate is selected by incrementing the counter at step 214*a*, and comparing with 26 at step 203*a*.

If the candidate point $n_i$ satisfies the first distance transform comparison at step 204*a* but fails the second distance transform comparison at step 205*a*, it is determined whether the second distance transform value for the candidate point $n_i$ is equal to that for c at step 211*a*, again to determine the elements of buffer A in which to save the iteration counter of the candidate point $n_i$, at steps 212*a* and 213*a*. A candidate that satisfies the comparison of step 211*a* is preferred, i.e. has priority as a backup candidate, over a candidate that fails that comparison. However, both of these candidates have lower priority than the candidate that fails step 203*a* and satisfies step 207*a*. The iteration counter is incremented at step 214*a*, and compared with 26 at step 203*a*. If the iteration counter is less than 26, not all neighbors have been visited, and steps 204*a* to 214*a* and 216*a* and 217*a* are repeated from step 203*a*. Otherwise, all neighbors have been visited, and, at step 215*b*, it is determined from one of the saved candidate points which previous candidate should be the newly selected next point on the path, based on the priorities. Step 215*a* enforces the candidate priorities in the order of comparisons. The newly selected point is added to the path at step 216*a*, and its first distance transform value is checked at step 217*a*.

Figure 2A:
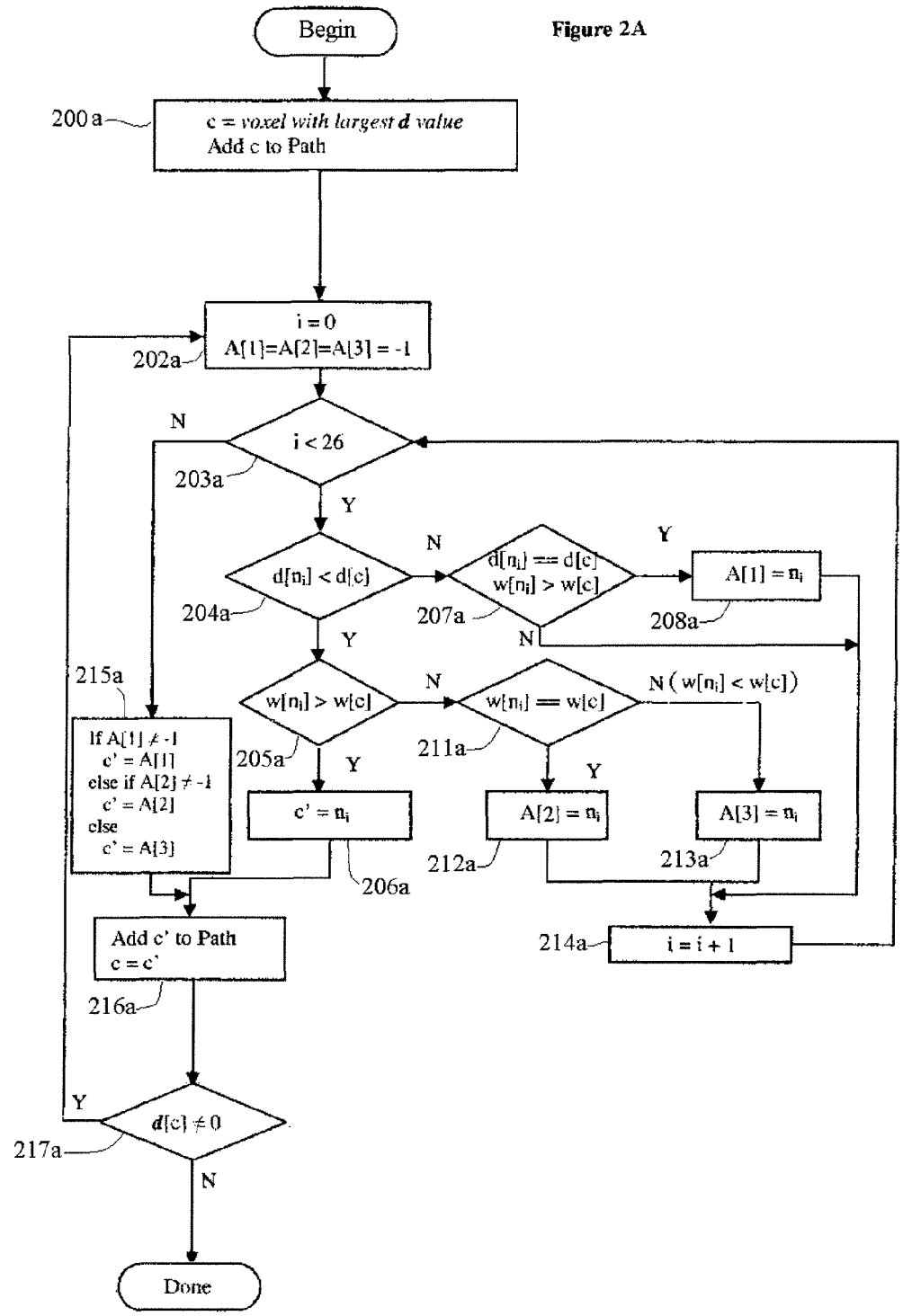
FIGS. 2A-B are flowcharts of exemplary path generation algorithms according to embodiments of the invention.

A centerline search according to an embodiment of the invention as depicted in FIG. 2A traverses two lists: (1) d—the distance to target map; and (2) w—the distance to wall map. A centerline search according to an embodiment of the invention attempts to march towards the target, and stays as far away from the wall as possible. At any location, the 26 neighbors of a voxel are considered. The decisions in the flowchart of FIG. 2A can be summarized in the following table, where + means better, 0 same, and − means worse, and a better d means lower distance to target, and a better w means higher distance to wall:

| d | w | Result |
|---|---|---|
| + | + | $1^{st}$ choice -stop |
| + | 0 | $3^{rd}$ choice |
| + | − | $4^{th}$ choice |
| 0 | + | $2^{nd}$ choice |
| 0 | 0 | none |
| 0 | − | none |
| − | + | none |
| − | 0 | none |
| − | − | none |

The centerline search of FIG. 2A goes into the direction of better distance, or the same distance if there is a better wall distance. But there are cases where this path can go to close to the wall because of a particular geometry.

According to another embodiment of the invention, the constraints may be relaxed to allow a worse d under the condition that w is better AND the direction of the new neighbor is similar to the direction it would have moved in the centerline search of FIG. 2A, as summarized in the following table.

| d | w | Result |
|---|---|---|
| + | + | $1^{st}$ choice -stop |
| + | 0 | $3^{nd}$ choice |
| + | − | $5^{th}$ choice |

-continued

| d | w | Result |
|---|---|---|
| 0 | + | $2^{nd}$ choice |
| 0 | 0 | none |
| 0 | − | none |
| − | + | $4^{th}$ choice IF direction of neighbor is similar to $5^{th}$ choice. |
| − | 0 | none |
| − | − | none |

Taking the direction into account prevents the path from moving back. Additional safeguards include marking a voxel that has been passed so it cannot be visited again.

Figure 2B:
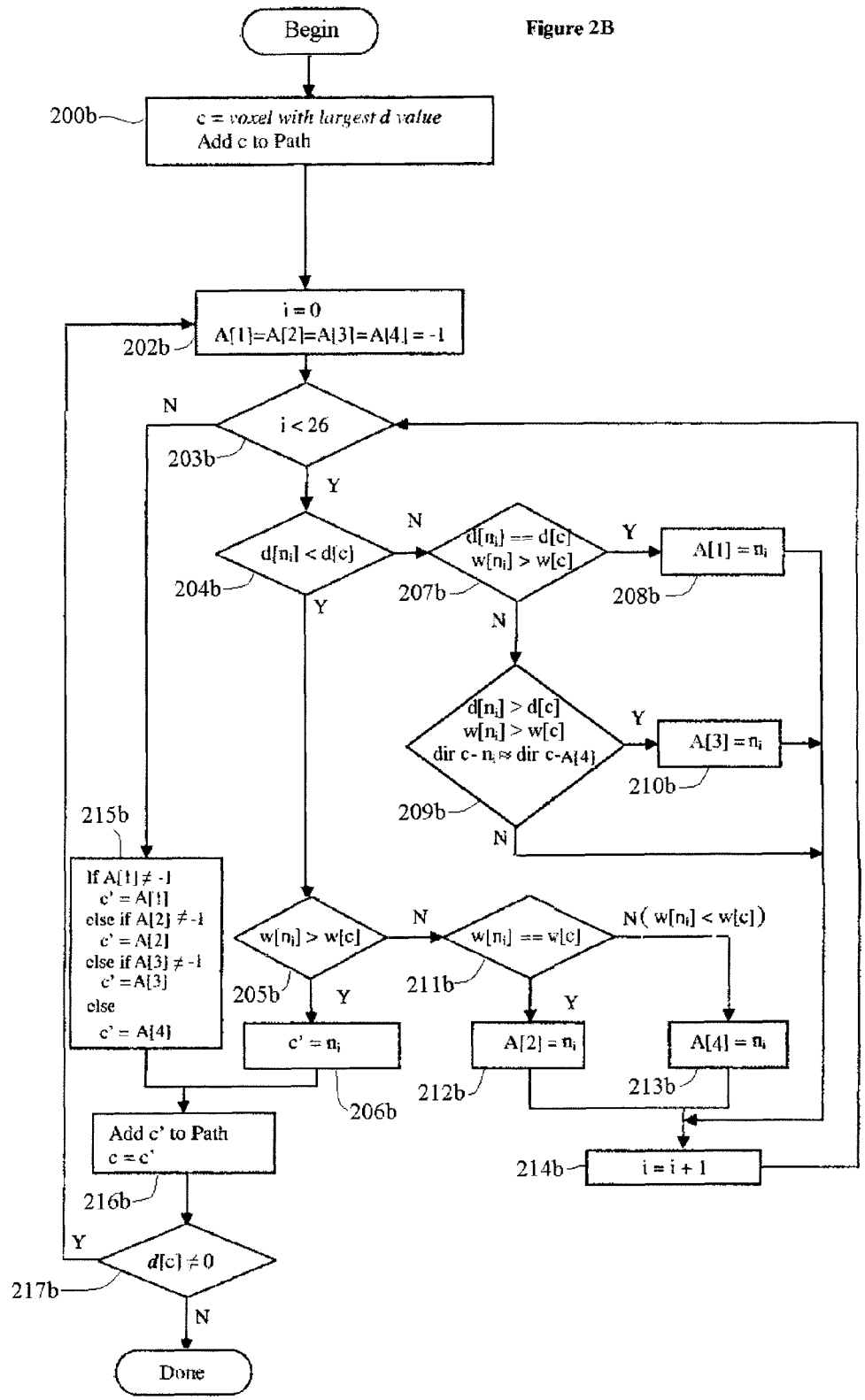

A flowchart of a centerline search algorithm according to an embodiment of the invention consistent with the relaxed constraints is depicted in FIG. 2B. In FIG. 2B, the same numbers refer to the same steps as FIG. 2A, and so a description of FIG. 2B will focus on the additional steps, steps 209*b* and 210*b*. A repeated description of the similar steps will be omitted. The comparison of step 209*b* is evaluated if the comparison of step 207*b* fails. At step 209*b*, it is determined whether the first distance transform for the candidate point $n_i$ is greater than that of c, whether the second distance transform value for the candidate point $n_i$ is greater than that for c, and whether the direction of the candidate point is similar to that of a point which satisfies that satisfies of step 203*b* but fails the comparisons of steps 205*b* and 211*b*, i.e., a point whose first distance transform value is less than that for c, and whose second distance transform value is less that that for c. To put this third condition more succinctly, using the notation of the drawing, the condition is: if $dir(c-n_i) \approx dir(c-A[4])$, where $dir(c-n_i)$ refers to a direction vector from c to neighbor $n_i$, and the similarity operator "$\approx$" means that the angle between the two direction vectors is smaller than a predetermined constant, for example, 90 degrees. If the candidate point $n_i$ satisfies the comparison at step 209*b*, the candidate point is saved in the buffer A at step 210*b*. This candidate is preferred over the candidate that fails the comparisons of steps 205*b* and 211*b*, but less preferred, i.e., has lass priority as a backup choice, than the other candidates. The next candidate is selected by incrementing the counter at step 214*b*, and comparing with 26 at step 203*b*. If the candidate point $n_i$ fails the comparison at step 209*b*, the next candidate is selected.

It is to be understood that the methods depicted in the flowcharts of FIGS. 2A and 2B are exemplary and non-limiting, and other equivalent methods for finding a colonic centerline that maximize the distance of the centerline from the colonic wall are within the scope of other embodiments of the invention. For example, the centerline could be initialized by the source point, and could continue until a point with a greatest distance from the source point is reached.

Figure 5:
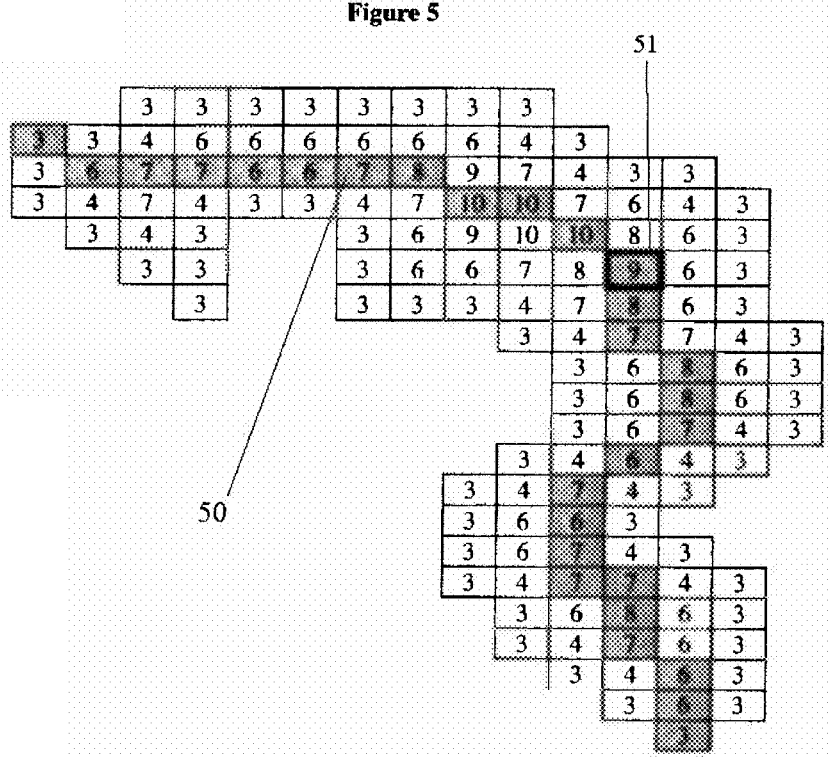
FIG. 5 shows the corresponding distance to wall transform based on the Chamfer (3, 4) metric, according to an embodiment of the invention

FIG. 3 shows an example of the distance to source transform for a 2D object. The two extreme points 31, 32 are identified with distance values of 0 and 31, respectively. FIG. 4 and FIG. 5 show the corresponding distance to wall transform based on the city-block metric and the Chamfer (3, 4) metric, respectively. The initial paths 40 and 50 are highlighted in both FIGS. 4 and 5. FIG. 5 also shows a centerline voxel 51 with a bold outline that had been moved towards the center, compared to the previous figure, as a result of applying the second distance transform.

Referring back to FIG. 1, once the initial path is constructed, according to an embodiment of the invention, a smoothing process may be applied at step 15 to avoid abrupt changes of view-positions and directions. During the smoothing process, special attention should be taken to avoid collisions with the colon wall. As a final step 16, a re-centering step is applied to the generated path in case the smoothing step moves voxels closer to the wall. An exemplary, non-limiting re-centering method may be based on growing spheres.

Figure 6:
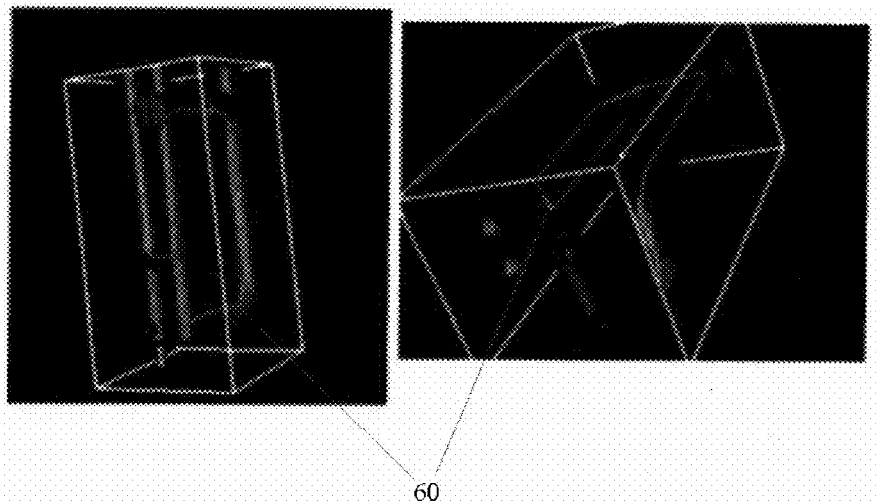
FIG. 6 illustrates the centerline result for a phantom dataset, according to an embodiment of the invention.
Figure 7:
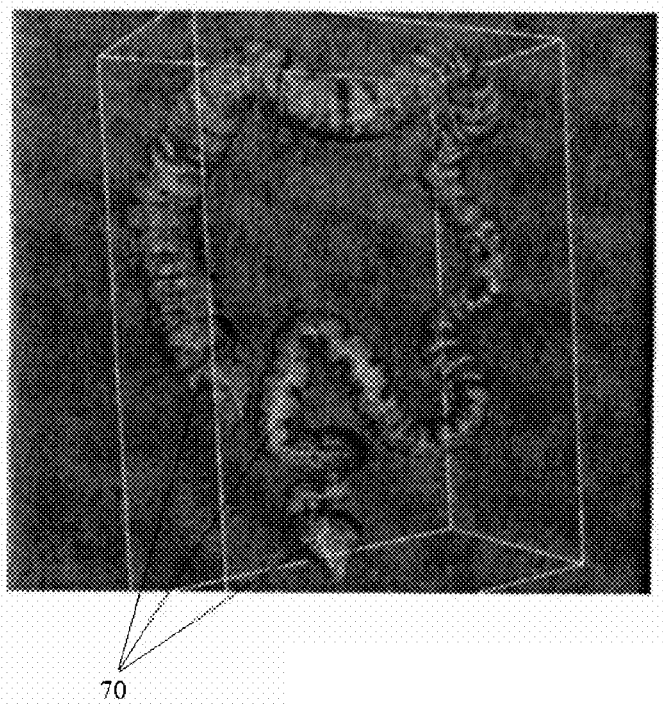
FIG. 7 shows the colon centerline result on a 512×512×415 colon dataset, according to an embodiment of the invention.

FIG. 6 illustrates the centerline results 60 for a phantom dataset, while FIG. 7 shows the colon centerline result 70 on a 512×512×415 colon dataset, computed on a 3.19 GHz processor with 2 GB of RAM in less than 3 seconds.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 8:
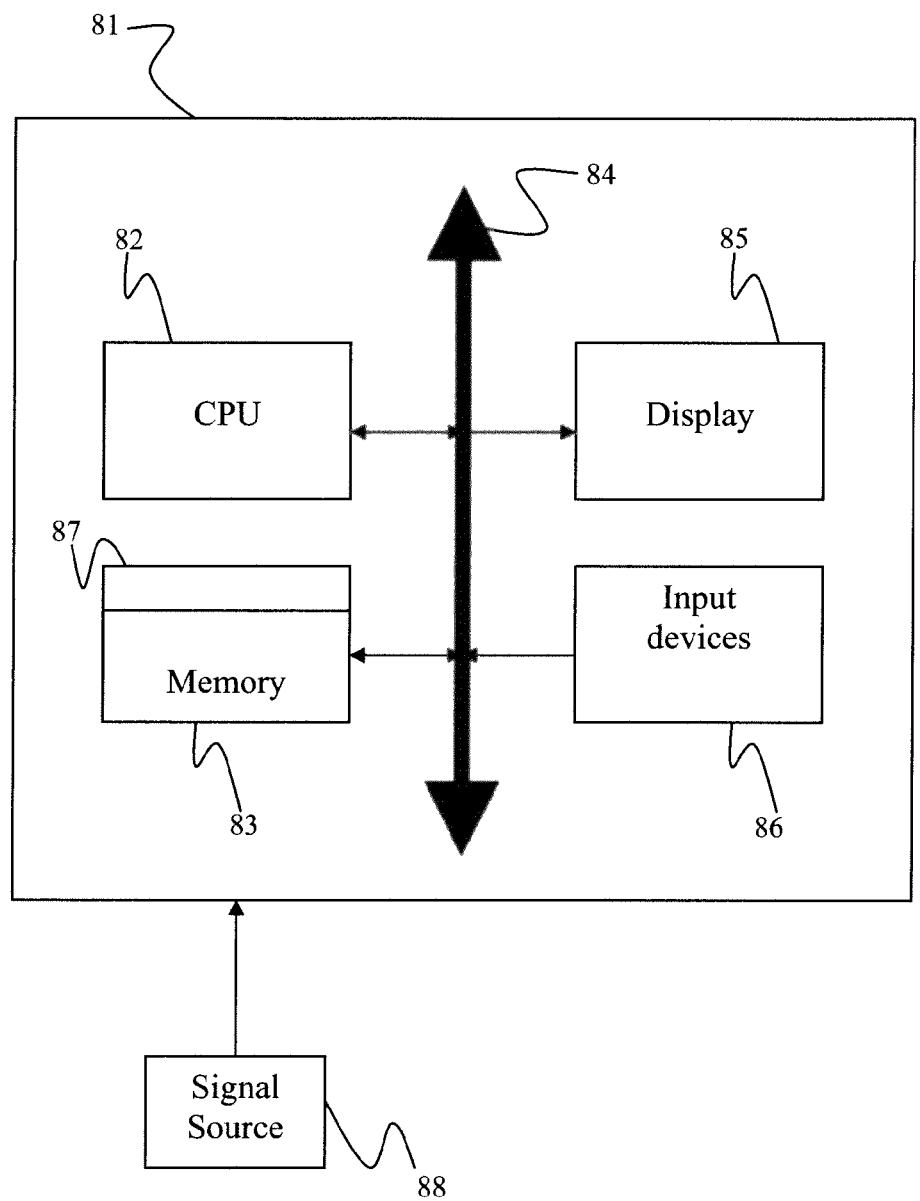
FIG. 8 is a block diagram of an exemplary computer system for implementing a method for automatically extracting a colon centerline from a digital medical image, according to an embodiment of the invention.

FIG. 8 is a block diagram of an exemplary computer system for implementing a method for automatically extracting a colon centerline from a digital medical image, according to an embodiment of the invention. Referring now to FIG. 8, a computer system 81 for implementing the present invention can comprise, inter alia, a central processing unit (CPU) 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present invention can be implemented as a routine 87 that is stored in memory 83 and executed by the CPU 82 to process the signal from the signal source 88. As such, the computer system 81 is a general purpose computer system that becomes a specific purpose computer system when executing the routine 87 of the present invention.

The computer system 81 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for extracting a colonic centerline from a digital image, comprising the steps of:

segmenting a colon from a digital image of a patient's abdomen, and selecting one extreme point of the colon in the segmented image as a source point; and generating an initial centerline path through the colon using a first distance transform and a second distance transform, starting from a point with a greatest distance to the source point as determined by the first distance transform, and adding points to the centerline path by selecting points with a greatest distance to the source point but less than the distance of the starting point as determined by the first distance transform that are farthest from the wall of the colon using a second distance transform, wherein generating an initial centerline path through the colon using the first distance transform and the second distance transform further comprises repeating, for each current path point, until the source point is reached, visiting all k connected neighbors of the current path point, wherein if the first distance transform of a currently visited neighbor is less than the first distance transform of the current path point and the second distance transform of the currently visited neighbor is greater than the second distance transform of the current path point, the currently visited neighbor is added to the path and is assigned as the current path point, if the first distance transform of a currently visited neighbor is less than the first distance transform of the current path point and the second distance transform of the currently visited neighbor is equal to the second distance transform of the current path point, the currently visited neighbor is assigned as a first priority backup point, if the first distance transform of a currently visited neighbor is equal to the first distance transform of the current path point and the second distance transform of the currently visited neighbor is greater than the second distance transform of the current path point, the currently visited neighbor is assigned as a second priority backup point, if the first distance transform of a currently visited neighbor is greater than the first distance transform of the current path point and the second distance transform of the currently visited neighbor is greater than the second distance transform of the current path point, the currently visited neighbor is assigned as a third priority backup point, and if the first distance transform of a currently visited neighbor is less than the first distance transform of the current path point and the second distance transform of the currently visited neighbor is less than the second distance transform of the current path point, the currently visited neighbor is assigned as a fourth priority backup point.

2. The method of claim 1, further comprising calculating a first distance transform of every point in the colon, wherein said first distance transform of a point is a distance of that point to the source point of the colon, by using a region growing algorithm that starts with the source point, assigns an initial distance of 0 to the source point, and at each iteration assigns a distance to neighbors of a previously visited point that is an increment of the distance of the previously visited point.

3. The method of claim 1, further comprising calculating a second distance transform of every point in the colon, wherein said second distance transform of a point is a shortest distance of that point to a wall point of the colon, by using a region growing algorithm that starts from surface points by the colonic wall, assigns an initial distance of 1 to each surface point, and at each iteration assigns a distance to neighbors of a previously visited point that is an increment of the distance of the previously visited point.

4. The method of claim 1, further comprising, after all k connected neighbors of the current path point have been visited, selecting a highest priority backup point to be added to the path, and assigning the highest priority backup point as the current path point.

5. The method of claim 1, further comprising smoothing the initial colonic centerline path, and, if the smoothing moves colonic centerline path points closer to the colonic wall, re-centering the colonic centerline path.

6. A method for extracting a colonic centerline from a digital image, comprising the steps of:
   segmenting a colon from a digital image of a patient's abdomen, and selecting one extreme point of the colon in the segmented image as a source point; and
   generating an initial centerline path through the colon using a first distance transform and a second distance transform, starting from a point with a greatest distance to the source point as determined by the first distance transform, and adding points to the centerline path by selecting points with a greatest distance to the source point but less than the distance of the starting point as determined by the first distance transform that are farthest from the wall of the colon using a second distance transform,
   wherein generating an initial centerline path through the colon using the first distance transform and the second distance transform further comprises repeating, for each current path point, until the source point is reached, visiting all k connected neighbors of the current path point, wherein
   if the first distance transform of a currently visited neighbor is less than the first distance transform of the current path point and the second distance transform of the currently visited neighbor is greater than the second distance transform of the current path point, the currently visited neighbor is added to the path and is assigned as the current path point,
   if the first distance transform of a currently visited neighbor is less than the first distance transform of the current path point and the second distance transform of the currently visited neighbor is equal to the second distance transform of the current path point, the currently visited neighbor is assigned as a first priority backup point,
   if the first distance transform of a currently visited neighbor is equal to the first distance transform of the current path point and the second distance transform of the currently visited neighbor is greater than the second distance transform of the current path point, the currently visited neighbor is assigned as a second priority backup point, and
   if the first distance transform of a currently visited neighbor is less than the first distance transform of the current path point and the second distance transform of the currently visited neighbor is less than the second distance transform of the current path point, the currently visited neighbor is assigned as a third priority backup point.

7. The method of claim 6, further comprising calculating a first distance transform of every point in the colon, wherein said first distance transform of a point is a distance of that point to the source point of the colon, by using a region growing algorithm that starts with the source point, assigns an initial distance of 0 to the source point, and at each iteration assigns a distance to neighbors of a previously visited point that is an increment of the distance of the previously visited point.

8. The method of claim 6, further comprising calculating a second distance transform of every point in the colon, wherein said second distance transform of a point is a shortest distance of that point to a wall point of the colon, by using a region growing algorithm that starts from surface points by the colonic wall, assigns an initial distance of 1 to each surface point, and at each iteration assigns a distance to neighbors of a previously visited point that is an increment of the distance of the previously visited point.

9. The method of claim 6, further comprising, after all k connected neighbors of the current path point have been visited, selecting a highest priority backup point to be added to the path, and assigning the highest priority backup point as the current path point.

10. The method of claim 6, further comprising smoothing the initial colonic centerline path, and, if the smoothing moves colonic centerline path points closer to the colonic wall, re-centering the colonic centerline path.

11. A non-transitory program storage device readable by a computer, tangibly embodying a program of instructions executed by the computer to perform the method steps for extracting a colonic centerline from a digital image, the method comprising the steps of:
   segmenting a colon from a digital image of a patient's abdomen, and selecting one extreme point of the colon in the segmented image as a source point; and
   generating an initial centerline path through the colon using a first distance transform and a second distance transform, starting from a point with a greatest distance to the source point as determined by the first distance transform, and adding points to the centerline path by selecting points with a greatest distance to the source point but less than the distance of the starting point as determined by the first distance transform that are farthest from the wall of the colon using a second distance transform,
   wherein generating an initial centerline path through the colon using the first distance transform and the second distance transform further comprises repeating, for each current path point, until the source point is reached, visiting all k connected neighbors of the current path point, wherein
   if the first distance transform of a currently visited neighbor is less than the first distance transform of the current path point and the second distance transform of the currently visited neighbor is greater than the second distance transform of the current path point, the currently visited neighbor is added to the path and is assigned as the current path point,
   if the first distance transform of a currently visited neighbor is less than the first distance transform of the current path point and the second distance transform of the currently visited neighbor is equal to the second distance transform of the current path point, the currently visited neighbor is assigned as a first priority backup point,
   if the first distance transform of a currently visited neighbor is equal to the first distance transform of the current path point and the second distance transform of the currently visited neighbor is greater than the second distance transform of the current path point, the currently visited neighbor is assigned as a second priority backup point, and if the first distance transform of a currently visited neighbor is less than the first distance transform of the current path point and the second distance transform of the currently visited neighbor is less than the second distance transform of the current path point, the currently visited neighbor is assigned as a third priority backup point.

12. The computer readable program storage device of claim 11, the method further comprising calculating a first distance transform of every point in the colon, wherein said first distance transform of a point is a distance of that point to the source point of the colon, by using a region growing algorithm that starts with the source point, assigns an initial distance of 0 to the source point, and at each iteration assigns a distance to neighbors of a previously visited point that is an increment of the distance of the previously visited point.

13. The computer readable program storage device of claim 11, the method further comprising calculating a second distance transform of every point in the colon, wherein said second distance transform of a point is a shortest distance of that point to a wall point of the colon, by using a region growing algorithm that starts from surface points by the colonic wall, assigns an initial distance of 1 to each surface point, and at each iteration assigns a distance to neighbors of a previously visited point that is an increment of the distance of the previously visited point.

14. The computer readable program storage device of claim 11, the method further comprising, after all k connected neighbors of the current path point have been visited, selecting a highest priority backup point to be added to the path, and assigning the highest priority backup point as the current path point.

15. The computer readable program storage device of claim 11, the method further comprising smoothing the initial colonic centerline path, and, if the smoothing moves colonic centerline path points closer to the colonic wall, re-centering the colonic centerline path.

* * * * *